(12) United States Patent
Stingone, Jr.

(10) Patent No.: US 6,263,280 B1
(45) Date of Patent: Jul. 17, 2001

(54) GLOBAL LOCATING AND TRACKING METHOD AND SYSTEM

(76) Inventor: Ralph J. Stingone, Jr., 11 Simone Dr., Poughkeepsie, NY (US) 12603

( * ) Notice: Subject to any disclaimer, the term of this patent is extended or adjusted under 35 U.S.C. 154(b) by 0 days.

(21) Appl. No.: 09/198,909

(22) Filed: Nov. 24, 1998

(51) Int. Cl.$^7$ .................................................. G01C 21/00
(52) U.S. Cl. ............... 701/213; 342/357.07; 342/357.09; 342/457
(58) Field of Search .................................. 701/207, 213, 701/214, 215; 342/357.07, 358.09, 457; 340/573.1

(56) References Cited

U.S. PATENT DOCUMENTS

| | | |
|---|---|---|
| 5,111,209 | 5/1992 | Toriyama . |
| 5,379,224 | 1/1995 | Brown et al. . |
| 5,461,365 | 10/1995 | Schlager et al. . |
| 5,493,294 | 2/1996 | Morita . |
| 5,512,902 | 4/1996 | Guthrie et al. . |
| 5,525,967 | 6/1996 | Azizi et al. . |
| 5,554,993 | 9/1996 | Brickell . |
| 5,689,240 | 11/1997 | Traxler . |
| 5,703,598 | 12/1997 | Emmons . |
| 5,841,352 | * 11/1998 | Prakash ............................ 342/357.07 |
| 5,905,461 | * 5/1999 | Neher ............................... 342/357.07 |
| 5,928,306 | * 7/1999 | France et al. ......................... 701/207 |
| 5,969,673 | * 10/1999 | Bickley et al. .................. 342/357.07 |
| 6,028,537 | * 2/2000 | Suman et al. ......................... 342/457 |
| 6,104,978 | * 8/2000 | Harrison et al. ..................... 342/457 |

* cited by examiner

Primary Examiner—Gary Chin
(74) Attorney, Agent, or Firm—Dale J. Ream

(57) ABSTRACT

A method and system for locating and tracking the geographic position of a remote unit worn or carried by a user comprises a battery powered remote unit which upon user activation receives geographic position signals from geographic positioning satellites. The geographic position signals are encoded with a unique code associated with the remote unit and then transmitted from the remote unit to a central control center. The geographic position of the remote unit is determined according to the geographic position signals and then relayed to a computer network database server system. The geographic position along with personal information previously stored on the server system is then displayed at a network location such that a search for the wearer of the remote unit can be initiated by persons having access to the network location. Following initial activation, the remote unit receives and transmits signals only at predetermined time intervals so as to conserve battery power of the remote unit.

8 Claims, 5 Drawing Sheets

GLOBAL LOCATING AND TRACKING METHOD AND SYSTEM

BACKGROUND OF THE INVENTION

The present invention relates generally to systems and methods for determining position and, more particularly, to a method and system for locating and tracking the global position of a remote unit worn by a user.

The Global Positioning System (GPS), a network of approximately twenty-four satellites and twelve ground stations, has long been utilized as an aid to navigation. A typical GPS receiver unit can determine its global position by receiving position and velocity data from three or more GPS satellites and including doppler shift measurements in the calculations. More recently, GPS technology has been utilized in search and rescue applications.

The problem of notifying a rescue team of the position of a distress signal was recognized in U.S. Pat. No. 5,554,993 to Brickell. The '993 patent proposes transmitting a single approximate position to a single rescue team who then attempts a rescue. Although assumably effective in operation, the broad range of agencies, emergency personnel, and persons associated with the person initiating the distress signal are not simultaneously or quickly notified. Such notification is particularly necessary and desirable in the case of a child who is lost, injured, or abducted.

Another significant problem with present GPS systems is maintaining the power supply of the remote signaling unit. Although U.S. Pat. No. 5,703,598 attempts to solve this problem by enabling the remote unit to signal its position for short periods of time, the system requires a central station to repetitively solicit the remote signal.

It is therefore desirable to have a system and method having a remote unit which upon user activation receives and transmits global position data ultimately to a computer network database server which displays the geographic position and associated personal information at a globally accessible network location. It is also desirable to have a remote unit which only receives and transmits signals at predetermined times following activation so as to conserve battery power.

SUMMARY OF THE INVENTION

The present invention is directed toward a method and system for locating and tracking the geographic position of a remote unit worn or carried by a user. Upon manual activation by a user, a receiver within the remote unit receives global position signals from global position system satellites and then transmits the signals to a central control center via a satellite along with a unique code associated with the remote unit. Using the position signals, the control center determines the geographic position of the remote unit and relays this position to a wide-area computer network database server system. The geographic position is then displayed at a network location, such as an Internet worldwide-web site, so that a search can be initiated and monitored by persons having access to the network location. The remote unit includes an interval timer which inhibits the receiving and transmitting of signals except after predetermined intervals of time so as to conserve the battery power of the remote unit. Each additional reception and transmission of geographic position signals results in updated position data being displayed at the network location so that the present position of the remote unit can be monitored by all persons with access to the network location.

It is therefore a general object of the invention to provide a method and system for locating and tracking the geographic position of a user using the Global Positioning System.

Another object of the invention is to provide a method and system, as aforesaid, having a remote unit which can receive and transmit GPS position signals upon activation by a user.

Still another object of the invention is to provide a method and system, as aforesaid, which can transmit a unique code associated with the remote unit.

Yet another object of the invention is to provide a method and system, as aforesaid, which receives and transmits signals only at predetermined timed intervals.

A further object of the invention is to provide a method and system, as aforesaid, wherein the remote unit is in the form of a watch.

A still further object of the invention is to provide a method and system, as aforesaid, which determines the geographic position of the remote unit according to the geographic position signals.

A particular object of the invention is to provide a method and system, as aforesaid, which can display the geographic position and other related information at a wide-area computer network location.

Another object of the invention is to provide a method and system, as aforesaid, in which network transmissions are in the form of encrypted digital signals.

Still another object of the invention is to provide a method and system, as aforesaid, which can automatically transmit electronic mail messages to persons associated with the remote unit.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 4:
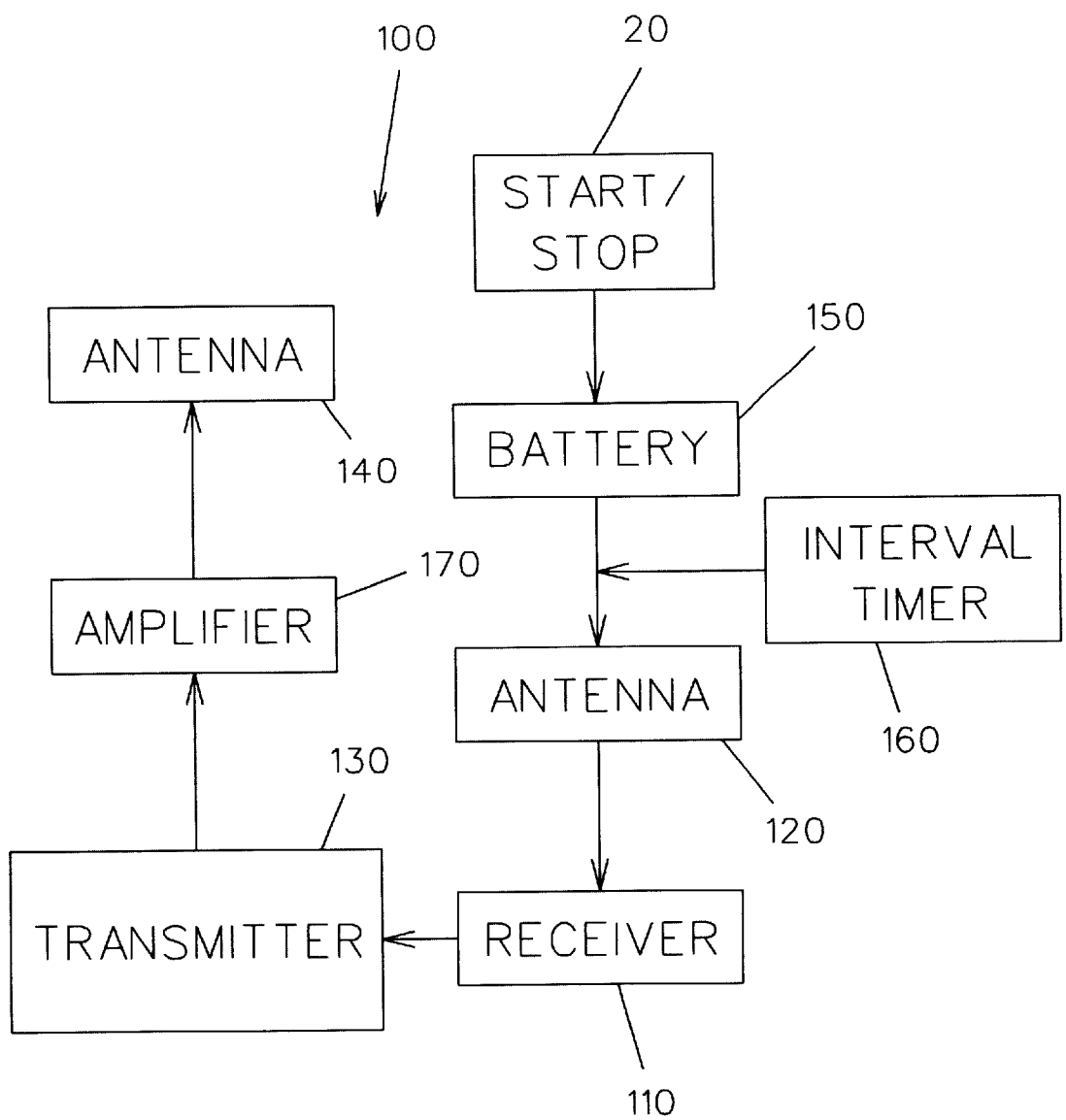
FIG. 4 is a block diagram of a transceiver assembly of the present system.
Figure 5:
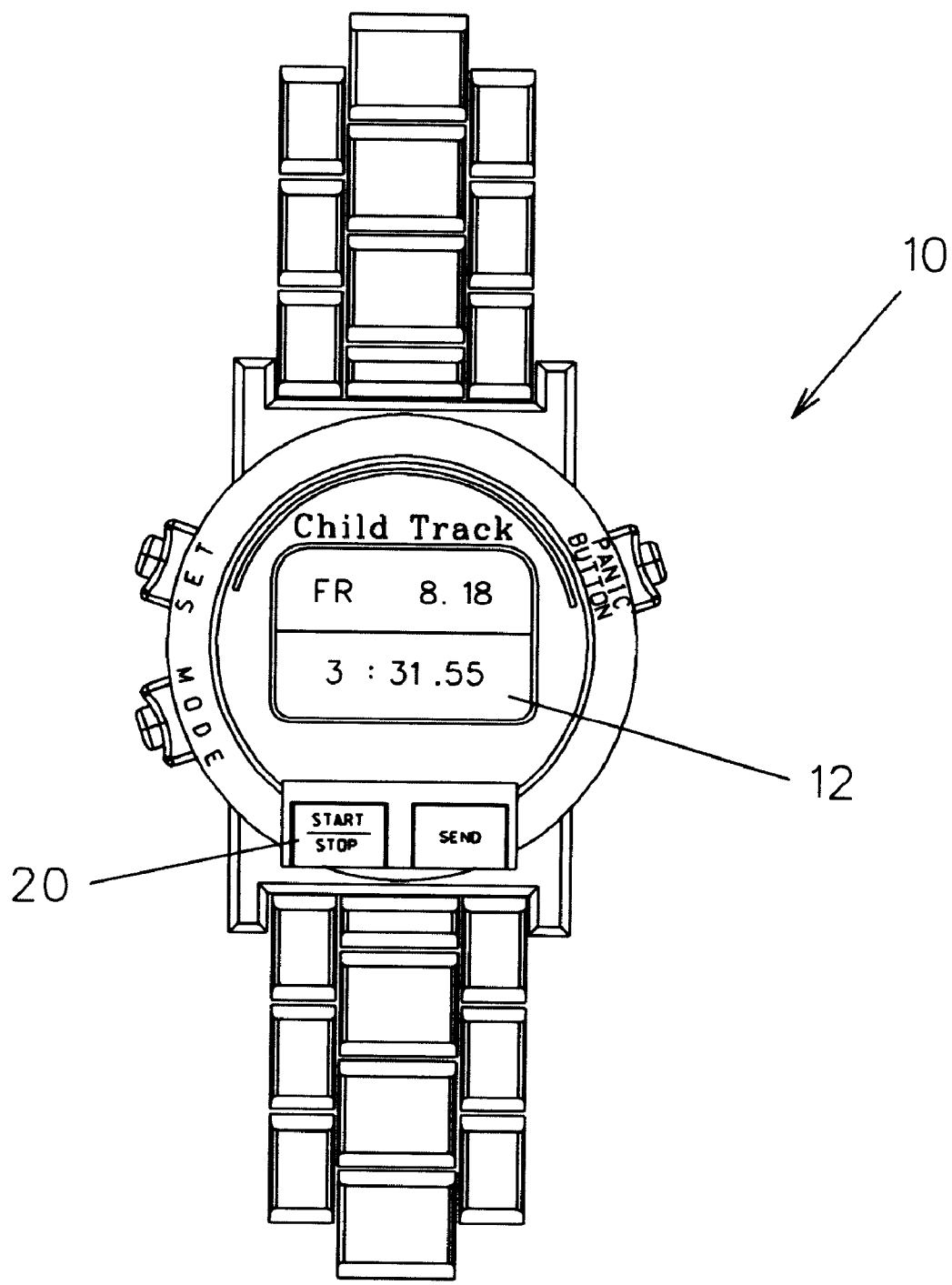
FIG. 5 is a view of a remote unit of the present system in the form of a watch, the watch face display being in a time mode.

Turning more particularly to the drawings, FIG. 4 shows a block diagram of a transceiver assembly 100 located in a remote signaling unit 10 worn or carried by a user. The remote unit 10, FIG. 5, is preferably in the form of a watch, it being understood that the watch may include actual time-telling mechanisms or may alternatively present the mere appearance of a watch, such as with numeric indicia 12, so as to disguise its true function (FIG. 5).

The transceiver assembly 100 includes a Global Position System (GPS) receiver 110 and a transmitter 130 with first 120 and second 140 antennas being associated therewith, respectively. The transceiver assembly 100 further includes a battery power source 150 for energizing the transmitter 130 and receiver 110, battery power being initially delivered thereto upon depression of the start/stop button 20. An interval timer 160 is also included in the transceiver assembly 100 which allows operation of the receiver 110 and transmitter 130 only at predetermined periodic intervals so as to conserve battery power.

Figure 1:
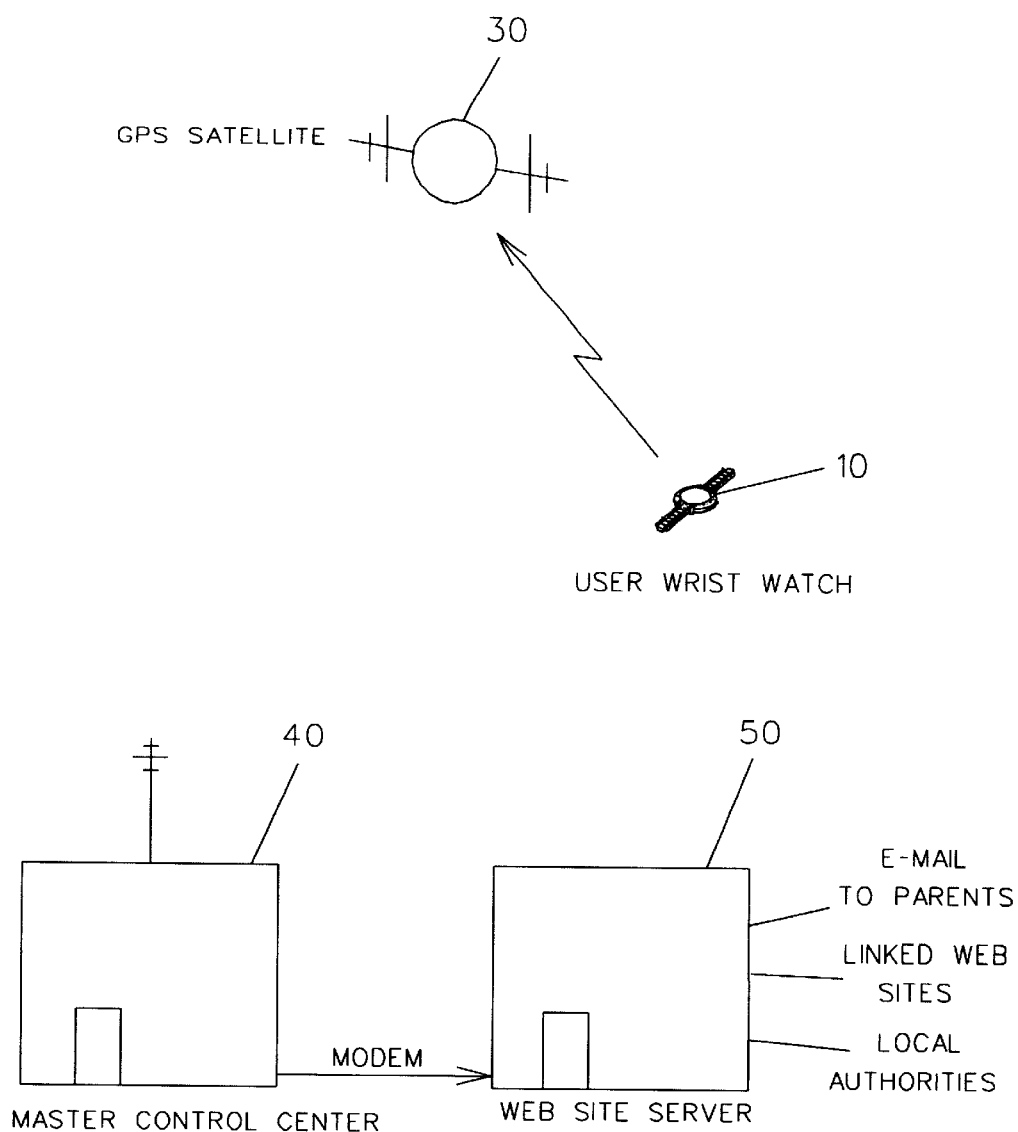
FIG. 1 is a diagrammatic illustration of the preferred method of the present invention with the remote unit receiving geographic position data signals from a GPS satellite.
Figure 2:
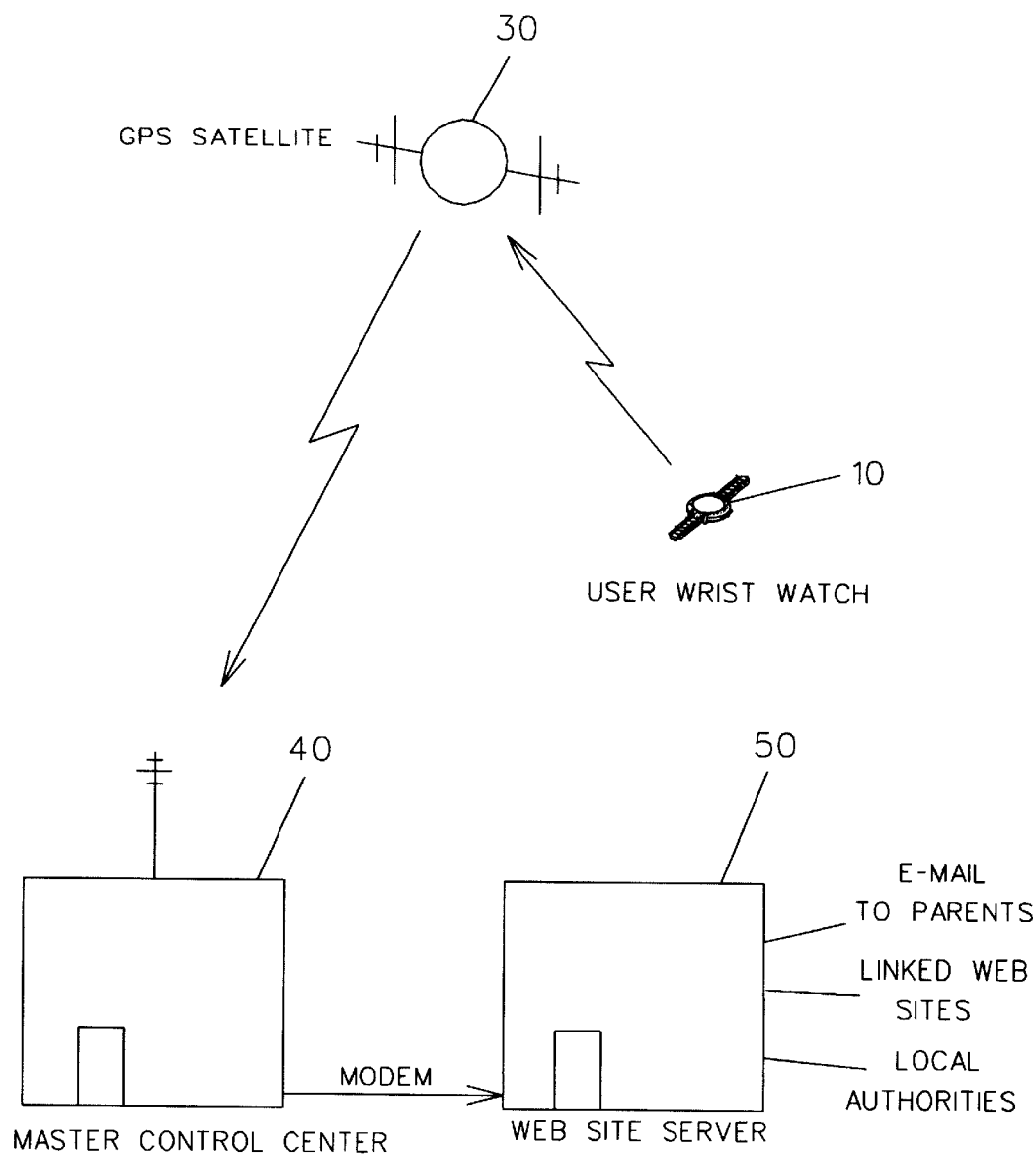
FIG. 2 is a diagrammatic illustration of the method of FIG. 1 with the geographic position signals being transmitted to a central control center via a satellite.
Figure 3:
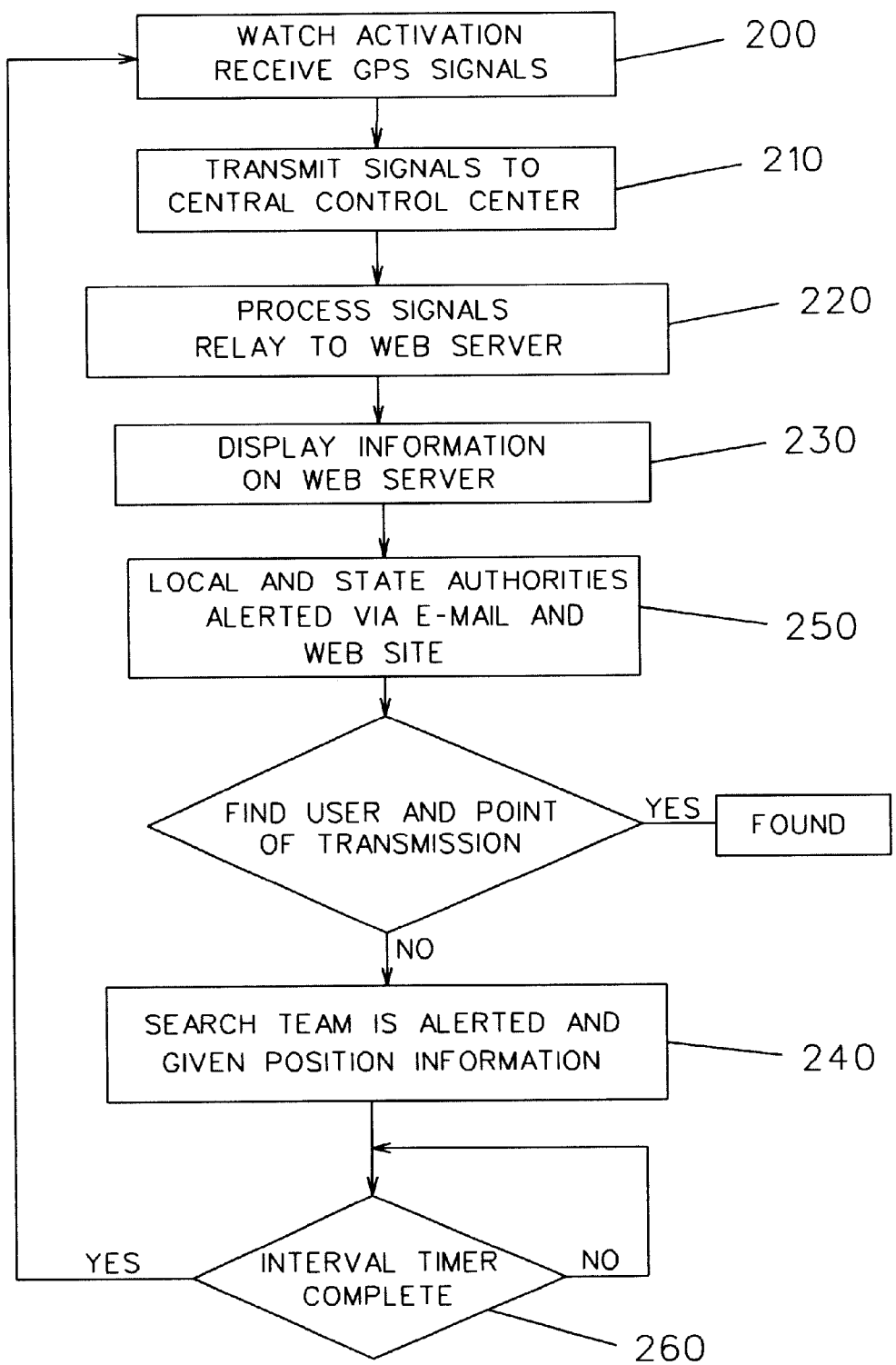
FIG. 3 is a block diagram of the method of the present invention.

Operation of the present method and system is best illustrated by the flowchart of FIG. 3. Upon initial delivery of power, the GPS receiver 110 intercepts signals from a global position satellite 30, as illustrated by block 200 of FIG. 3 via the antenna 120, the signals including satellite position, velocity, and doppler shift data (FIG. 1). The transmitter 130 then transmits the signals as a data stream from antenna 140 to a central control center 40 by reflecting the signals against a satellite 30, as indicated in block 210 of FIG. 3 and by FIG. 2. In addition, the transmitter transmits a code which is uniquely associated with the remote unit 10. It is understood that the signals and code being transmitted may need to be amplified by amplifier 170 to the required power for communicating with the satellite 30 (FIG. 4).

The data stream of geographic position signals received by the central control center 40 is processed according to a known position determination algorithm to determine the approximate geographic position of the remote unit 10, as shown in block 220 of FIG. 3. When the geographic position has been determined, the position data and unique remote unit code are relayed to a computer network database server system 50 via a modem or direct electronic connection (FIG. 2). Preferably, the position data and code are encoded using an encryption algorithm prior to transmittal to the server system 50 so as to prevent the data from being intercepted and modified.

The network database server system 50 includes a database containing personal information associated with the unique remote unit code, the data having been previously stored in memory locations therein. Accordingly, the encrypted data stream is decrypted by the network server system 50 such that the data may be associated with related information. The related personal information may include the name, address, phone number, and emergency contact information of the person wearing the remote unit.

The geographic position of the remote unit 10 along with a predetermined subset of the previously stored personal information is then automatically posted at a wide-area network location, preferably an Internet world-wide-web site, as indicated by block 230 of FIG. 3. It is now well-known that data displayed on an Internet web site is instantly available throughout the world to persons having access thereto. Accordingly, law enforcement agencies, emergency rescue personnel, child abduction organizations, parents, etc. may be informed of the location of a person in distress and can immediately initiate rescue operations. A map corresponding to the geographic position may also be displayed. The network server 50 may also send electronic mail messages 250 to particular electronic network addresses according to information stored in the database.

Following reception and transmission of global position satellite signals, the interval timer 160 inhibits operation of the receiver 110 and transmitter 130 for a predetermined amount of time, as illustrated by block 260 of FIG. 3. Thereafter, the receiver 110 and transmitter 130 are again energized to intercept position signals and to transmit another data stream along with the unique code associated with the remote unit 10 to the control center 40. The signals are then processed and relayed to the network server 50 as previously described. Thus, the network location display is repeatedly updated to allow rescue personnel to monitor any changes in the location of the person wearing the remote unit 10. It is known that a network location such as a web site may be accessed via portable computers using modems and cellular phone transmissions. Accordingly, rescuers can receive updated position information while en route to the indicated position, as illustrated by block 240 of FIG. 3. This periodic updating of the geographic position will continue until the person wearing the remote unit is found.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A method for locating and tracking the geographic position of a remote unit using signals generated by a global positioning satellite system, comprising the steps of:
   (a) receiving global position data signals at a remote unit from a global positioning satellite;
   (b) encoding the data signals with a unique code associated with the remote unit;
   (c) transmitting the encoded data signals from the remote unit to a central control center via a satellite;
   (d) generating at the control center a geographic position of the remote unit according to the encoded data signals;
   (e) relaying the geographic position and the unique code to a computer network database server system, the network database server system adapted to store personal information associated with the unique code; and
   (f) displaying the geographic position of the remote unit and the personal information associated with the unique code at a network location whereby a search operation can be initiated and monitored by persons having access to the network location and wherein the geographic position and the associated personal information is further displayed on an Internet world-wed site, the web site including hypertext links to related web sites.

2. The method as claimed in claim 1 wherein the step of receiving global position data signals includes the steps of:
   activating the remote unit to receive data signals from the global positioning satellite;
   transmitting satellite position, velocity, and doppler shift data from the satellite to the remote unit; and
   receiving the satellite position, velocity, and doppler shift data by the remote unit.

3. The method as claimed in claim 1 wherein the step of relaying the geographic position signal and the unique code further includes the step of encoding the geographic position and the unique code to produce an encrypted signal.

4. The method as in claim 3 wherein the step of displaying the geographic position is preceded by the step of decrypting the encrypted signal.

5. The method as claimed in claim 1 further including the steps of:
   (g) providing an interval timer within the remote unit programmed to inhibit the remote unit from transmitting and receiving signals for a predetermined time interval; and
   (h) returning to step (a) upon expiration of the predetermined time interval.

6. The method of claim 1 further including the step of sending electronic mail messages to selected electronic addresses previously stored in the network database server system.

7. A global locating and tracking system comprising:
- a housing;
- a transceiver assembly held within the housing including:
  - a receiver adapted for receiving global position signals transmitted from a global positioning satellite, the data signals being indicative of a geographic location of the transceiver assembly;
  - a transmitter adapted for encoding the global position data signals with a unique code associated with the transceiver assembly and for transmitting the encoded global position data signals to a central control center via a satellite so as to update the geographic location of the transceiver assembly, the central control center adapted to determine the geographic position of the transceiver assembly according to the encoded global position data signals received from the transmitter;
  - an interval timer adapted to inhibit the transceiver assembly from transmitting and receiving signals during predetermined intervals of time;
- a power supply for powering the transmitter and receivers;
- a computer network database server system adapted to receive the geographic position of the transceiver assembly relayed thereto by the central control center, the network database server system adapted to store personal information associated with the unique code such that the network database server system is adapted to associate the personal information with the encoded global position data signals; and
- wherein said network database server system includes means for displaying the geographic position and the associated personal information on an Internet web site having hypertext links to related web sites.

8. A locating and tracking system as in claim 7 wherein the network database server system includes means for displaying the geographic position at a network location, the geographic position first being decrypted, whereby a search operation can be initiated and monitored by persons having access to the network location.

* * * * *

UNITED STATES PATENT AND TRADEMARK OFFICE
CERTIFICATE OF CORRECTION

PATENT NO. : 6,263,280 B1
DATED : July 17, 2001
INVENTOR(S) : Ralph J. Stingone, Jr.

It is certified that error appears in the above-identified patent and that said Letters Patent is hereby corrected as shown below:

<u>Title page,</u>
Inventor's address, change "11 Simone Drive Poughkeepsie, NY 12603" into -- 49 Sylvan Road, Port Chester, NY 10573 --.

Signed and Sealed this

Twenty-ninth Day of January, 2002

Attest:

Attesting Officer

JAMES E. ROGAN
*Director of the United States Patent and Trademark Office*